Patented Oct. 22, 1929

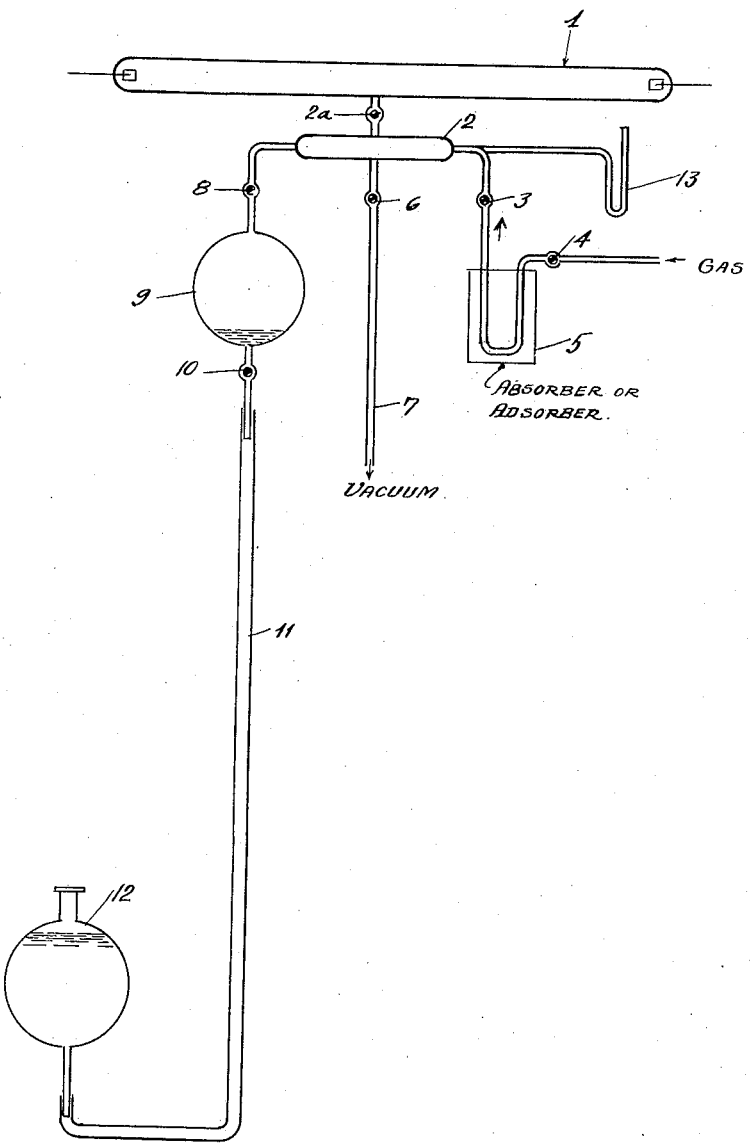

1,732,336

UNITED STATES PATENT OFFICE

RALPH W. LOHMAN, OF LOS ANGELES, CALIFORNIA

METHOD AND APPARATUS FOR PURIFYING AND CHARGING A GAS INTO VACUUM TUBES OR OTHER CONTAINERS

No Drawing.   Application filed November 1, 1926.   Serial No. 145,671.

This invention relates to the charging of a vacuum tube or other container with a purified gas, or to purification of a gaseous charge for or within a vacuum tube or other container, the system hereinafter described being capable of operation either to purify the gas before it is introduced into the vacuum tube, or simultaneously with such introduction; or the gas may even be first introduced into the vacuum tube and purified after such introduction. However, as the system, operated in either manner, involves the final compression of the gas from the comparatively low pressure at which the purifier acts efficiently to the comparatively higher pressure desired for vacuum tube operation, the invention may perhaps be best called a method or apparatus for purifying and charging the gas into a vacuum tube or the like, because a final operation in either case is a compression of the gas charge to the desired pressure.

I shall describe my invention particularly as applied to manufacture of vacuum tubes, but it will be understood that the invention is not thereby limited to such tubes, but may be applied to any containers desired to be charged with purified gas at a pressure higher than that at which known purifiers act efficiently. As is well known in the art of manufacturing vacuum tubes, particularly those containing some gas which, at the proper pressure, and when supplied with the requisite resonance potential, becomes luminous, it is extremely difficult to remove small but objectionable quantities of other gases and vapors from the desired gas. Thus in the manufacture of neon illuminating tubes exceedingly small quantities of certain other gases or vapors will completely destroy the visible spectrum of neon. Even if the desired gas in a nearly spectroscopically pure state is fed to the tube, the presence of gases in such a tube, which generally consist of hydrogen, oxygen, carbon dioxide, carbon monoxide and water vapor, will so destroy the visible spectrum of neon as to render the tube useless as a source of illumination.

It has therefore been the practice in the past to heat such tubes and their electrodes to the highest permissible temperature, while on the vacuum pump, thereby causing evolution or evaporation of such residual and undesired gases and vapors and their withdrawal to some extent by the vacuum pump. But it is also a well established fact that these residual gases and vapors cannot be completely cleaned up on the pump alone, and therefore certain absorbers, such as heated metallic calcium, or adsorbers, such as cooled charcoal, are employed to accomplish total clean up.

The operation of such absorbers and adsorbers, however, is a function of their own temperature and also of the pressure of the gas in which they are immersed. Thus the quantity absorbed and retained by heated calcium, for instance, and the rate of adsorption, increase with the temperature of the adsorber, but decrease with increase of pressure of the gas in which the absorber is immersed. Similarly, the quantity adsorbed by charcoal, for instance, the retentivity of the adsorber and the rate adsorption, increase as the temperature of the adsorber decreases, but decrease with increase in gas pressure (under commercial exhausting conditions).

Thus with say, calcium at red heat, the quantity absorbed per unit weight of absorber decreases with increase of pressure, the rate of absorption being very rapid below 1 or 2 mm. of mercury, but decreases to almost nothing at about 6 mm. of mercury, and not effecting any commercial rate of clean up at pressures above 7 or 8 mm. of mercury. And the same is true of adsorbers, under the conditions found in commercial vacuum tube exhaustion; that is, a large quantity of the desired gas containing appreciable admixtures of other gases or vapors in volume sufficient to saturate the adsorber. Such adsorbers will not, generally speaking, effect clean up, at a rate sufficiently rapid to permit their commercial use, at pressures above 6 to 8 mm. of mercury.

I am aware that most published data, together with the general formulas for quantities of gas adsorbed per unit weight of adsorber, show such quantity as increasing with the pressure. Nevertheless it has long been a matter of common observation in commercial laboratories that clean up of neon illuminating tubes by absorbers and adsorbers practically ceases above 6 or 7 mms. pressure. There are many reasons for the apparent discrepancy between the hitherto published data and my own observations. Such data has invariably given the adsorption obtained by admitting a small observed quantity of a single gas to the adsorber, observing the final pressure in the adsorber vessel after reaching final saturation-equilibrium, and, knowing the volume of said vessel, calculating the volume adsorbed. But in the commercial exhaustion of neon lighting tubes for example, the conditions are, in contradistinction to the above, such that there is a very large volume of gaseous mixture in contact with the adsorber; a pressure differing from the final equilibrium saturation pressure, the pressure on the gas in contact with the adsorber being determined primarily by the pressure on the large volume of gas in the relatively large tube connected to the adsorber, and not determined by the adsorber itself.

However, Lemon & Blodgett state, in the "Physical Review" vol. XIV, 1919, page 395, that the result of their researches is to the following effect:

"A given quantity of pure gas, or of a mixture, is less completely adsorbed if admitted all at one time, than if it is admitted in two portions, the last portion being admitted after the first portion has reached equilibrium pressure."

This clearly indicates, as a result of direct observation, that at lower pressures (the pressure of the first quantity of gas admitted) the adsorption is greater per unit of volume of adsorber than at higher pressures (the pressure caused by the admission of the second quantity of gas).

And Wilson, in the "Physical Review" vol. 16, 1920, page 14, states as a result of similar investigations: "Adsorption of a mixture was found to be inferior to the sum of the adsorptions of the components. This is not an unexpected result, for, if the interior surfaces of the charcoal are largely covered with one gas, it is reasonable to assume that the forces producing adsorption are different from those that the denuded surface would show."

And as to the comparative operation of absorbers at low and high gas pressures, Soddy (the original discoverer of the use of calcium for this purpose) states, in the Proceedings of the Royal Society, 78, 420, 1907: "There is no doubt that a low initial pressure, not exceeding a few millimeters of mercury, is as essential a condition in causing calcium to combine with gases as a high temperature."

Thus the slow action of both adsorbers and absorbers above gas pressures of a few millimeters causes, (in the manufacture of luminous gaseous tubes wherein the required pressure for maximum efficiency of the tube, minimum voltage, and maximum life, is often 8 to 10 mms. or more) excessive loss of time in the attempt to properly purify and charge them, and in fact, absolutely precludes their charging with the desired gas to pressures of maximum all-round efficiency.

Many experiments in which both adsorbers and absorbers were left in contact with gases at pressures above 6 mms. for many days showed no detectable clean up of the undesired residual gases at the end of such period. Thus the progress of high pressure tubes through a factory has been extremely slow under prior methods and has accordingly been inordinately expensive, as will be well understood.

The present invention provides a method and apparatus whereby the desired gas may be wholly cleaned up at the low pressure best suited for most rapid clean up, and then compressed into the luminous tube at the high pressure best suited for highest all-around efficiency of the tube. How the invention makes these provisions will now be best understood from a consideration of the following detailed description wherein one form of method and apparatus illustrative of the invention is set forth, reference for this purpose being had to the accompanying drawings in which the single figure is a diagram representing a suitable complete apparatus.

In the drawings the tube which it is desired to charge with purified gas is represented at 1. A header is diagrammatically represented at 2, the tube 1, or any number of such tubes, being connectible to the header and the connection may be controlled by a valve or stop cock $2^a$. The absorber or adsorber 5 may be connected to header 2 through the stop cock 3, and the incoming gas may be fed to the absorber or adsorber through the stop cock 4; although, as I hereinafter point out, the incoming gas may be initially fed to any part of the system. It is not necessary that the incoming gas be fed first through the absorber or adsorber, but may be fed into the system at any point, coming into contact with the purifier by diffusion. The incoming gas will preferably have been purified as far as commercially possible before being put into the system.

The system is connected to a vacuum pump through connection 7 under control of stop cock 6. At 8 is a stop cock connecting header 2 to the comparatively large vessel 9, this vessel being connected to the tube 11 through stop cock 10 and thus to the vessel 12, which is designed to contain mercury or other heavy liquid. Tube 11 may be flexible to permit the raising or lowering of vessel 12 and thus to permit the displacement of mercury into, or withdrawal from, vessel 9. Vessel 12 with its flexible tube 11 thus constitutes one means of placing a variable but controlled pressure upon gas in vessel 9; but any other suitable means of placing a pressure on that gas, and changing that pressure, may be utilized. Preferably any method for placing pressure on gas in vessel 9 will involve the use of a heavy liquid such as mercury, to preclude the possibility of leakage of the gas out of vessel 9; but generally speaking, vessel 9 may be looked upon as one whose effective volume is variable, and variation of its effective gas containing volume by any suitable means will suffice broadly for the operation of the method herein described.

A vacuum gauge is indicated at 13 for the purpose of determining and ascertaining the pressures in the system at the several stages of operation.

The operation is typically as follows: The tube system, having first been thoroughly baked or heated and the residual gases exhausted, gas will then be admitted through stop cock 4 into the entire system, until the gauge reading indicates say from 1 to 3 mms. pressure. During this admission of gas the mercury or other heavy liquid will be withdrawn from vessel 9 so that vessel 9 may be filled or substantially filled with the gas. At the low pressure then present in the system the clean up of undesired gases from the major gas will be very rapid; in fact, under some circumstances it will be almost instantaneous. When the clean up has been effected which condition is readily observed by the eye as evidenced by the color of the tube, then the purifier will preferably be disconnected by closing stop cock 3, and then the mercury or other heavy liquid will be displaced from vessel 12 into vessel 9 in such an amount as will raise the gas pressure in the system to the optimum tube pressure. By properly proportioning the volume of vessel 9 to that of the tube and its connecting system, it will readily be seen that by passing mercury into the vessel 9 the pressure in the tube 1 can be increased to any desired value. Thus clean up and purification of the gas may be effected at the most efficient (relatively low) pressure, and the tube finally charged with the purified gas to the most efficient (relatively high) operating pressure. Disconnecting the purifier before raising the gas pressure prevents the gas at the higher pressures from coming into contact with the purifier; in other words the gas when in contact with the purifying substances is always at that pressure at which the substances will take up the impurities, and not at that higher pressure at which adsorption and absorption cease to operate and at which the substances might under some circumstances give up their previously accumulated impurities.

And as I have indicated before, it is not necessary that the impure gas be fed first through the purifier 5; it may be sufficient that the impure gas be fed into the system at any point; the whole body of gas in the system coming into effective contact with the absorbing or adsorbing agents by diffusion. Thus my method is not limited to the gas first being subjected to the action of the purifier and then passed into the remaining parts of the system or into the tube. The gas may be charged into the tube at low pressure either before, or simultaneously with, or subsequent to the introduction of the gas into contact with the purifying agent or agents. And in other regard also my invention is not limited to the precise details of construction and operation as above described, but includes such modifications and variations as come within the scope of the appended claims.

I claim:

1. The method herein described of purifying and charging a gas into a vacuum tube or other container, that includes introducing impure gas into contact with a purifier at the comparatively low pressure at which the purifier acts and thus purifying the gas, introducing the purified gas to the tube or container, isolating the purifier from the purified gas while still at said low pressure, and then raising the pressure of the gas in the tube or container out of contact with the purifier and without adding gas from the exterior of the system.

2. The method herein described of purifying and charging a gas into a vacuum tube or other container, that includes introducing impure gas into contact with a purifier at the comparatively low pressure at which the purifier acts and thus purifying the gas, introducing the purified gas to the tube or container, isolating the purifier from the purified gas while still at said low pressure, and then raising the pressure of the gas in the tube or container out of contact with the purifier and by compression only.

3. The method herein described of purifying and charging a gas into a vacuum tube or other container, that includes introducing impure gas into contact with a purifier at the comparatively low pressure at which the purifier acts and thus purifying the gas, introducing the purified gas at such low pressure into the tube or container and into an interconnected vessel whose effective volume is capable of variation, disconnecting the purifier from said vessel while the gas is still at said low pressure, and raising the pressure of the gas in the tube by compressing the gas in said vessel out of contact with the purifier.

4. The method herein described of purifying and charging a gas into a vacuum tube or other container, that includes connecting the tube or container to a system that includes a purifier acting at a comparatively low pressure and a vessel whose effective volume may be varied, allowing the purifier to act upon a charge of gas in the system at said comparatively low pressure, disconnecting the purifier from said vessel and said tube while the gas is still at said low pressure, and compressing the gas within the tube or container by compressing the gas in said vessel out of contact with the purifier.

5. The method herein described of purifying and charging a gas into a vacuum tube or other container that includes connecting the tube or container to a system that includes a purifier acting at a comparatively low pressure, allowing the purifier to act upon a charge of gas in the system at said comparatively low pressure, disconnecting the purifier from the system while the gas is still at said low pressure, and raising the gas pressure in the tube and system by compression out of contact with the purifier and without adding more gas from without the system.

6. The herein described method of purifying and charging a gas into a vacuum tube that requires for its operation a gaseous charge at a pressure greater than that at which a purifier acts efficiently, that includes feeding impure gas into a system connected with the tube and containing the purifier, at the comparatively low pressure at which the purifier acts efficiently, and thus allowing the purifier to purify the gas, disconnecting the purifier from the system while the gas is still at said low pressure, and compressing the purified gas in the system and tube to the pressure desired out of contact with the purifier.

7. The herein described method of purifying and charging a gas into a vacuum tube that requires for its operation a gaseous charge at a pressure greater than that at which a purifier acts efficiently, that includes feeding impure gas into a system connected with the tube and containing the purifier and a vessel whose effective volume may be varied at the comparatively low pressure at which the purifier acts efficiently, and thus allowing the purifier to purify the gas, disconnecting the purifier from said vessel while the gas is still at said low pressure, and compressing the purified gas in the system and tube, out of contact with the purifier, to the pressure desired by decreasing the effective volume of said vessel.

In witness that I claim the foregoing I have hereunto subscribed my name this ninth day of October, 1926.

RALPH W. LOHMAN.